United States Patent
Lutz et al.

(10) Patent No.: US 7,467,705 B2
(45) Date of Patent: Dec. 23, 2008

(54) UNIT FOR USE IN AUTOMATIC CONTAINER RETURN SYSTEMS

(75) Inventors: Bernhard Lutz, Delbrück (DE); Ullrich Marahrens, Lippstadt (DE)

(73) Assignee: Wincor Nixdorf International GmbH, Paderborn (DE)

( * ) Notice: Subject to any disclaimer, the term of this patent is extended or adjusted under 35 U.S.C. 154(b) by 106 days.

(21) Appl. No.: 11/449,817

(22) Filed: Jun. 9, 2006

(65) Prior Publication Data

US 2006/0225991 A1   Oct. 12, 2006

Related U.S. Application Data

(63) Continuation of application No. PCT/DE2004/002287, filed on Oct. 15, 2004.

(30) Foreign Application Priority Data

Dec. 12, 2003   (DE) .............................. 103 58 203

(51) Int. Cl.
*B65G 37/00* (2006.01)

(52) U.S. Cl. .................... 198/598; 198/474.1; 198/408; 198/626.5

(58) Field of Classification Search ................ 198/407, 198/408, 413, 626.5, 474.1, 598, 604, 608, 198/620

See application file for complete search history.

(56) References Cited

U.S. PATENT DOCUMENTS

| | | | | |
|---|---|---|---|---|
| 2,554,038 A | | 5/1951 | Lemmon | |
| 4,433,785 A | * | 2/1984 | Riggs et al. | 209/531 |
| 4,483,435 A | * | 11/1984 | Ionescu | 198/399 |
| 4,717,026 A | | 1/1988 | Fischer et al. | |
| 5,161,661 A | * | 11/1992 | Hammond | 194/209 |
| 5,434,428 A | * | 7/1995 | Paladini | 250/559.24 |
| 5,439,093 A | * | 8/1995 | Drewitz | 198/399 |
| 5,934,440 A | * | 8/1999 | Kroghrud | 194/212 |
| 6,148,990 A | * | 11/2000 | Lapeyre et al. | 198/779 |
| 6,431,343 B1 | * | 8/2002 | Lehtola et al. | 198/413 |
| 6,678,578 B2 | * | 1/2004 | Holmen et al. | 700/223 |

(Continued)

FOREIGN PATENT DOCUMENTS

DE   100 55 206 A1   5/2002

(Continued)

OTHER PUBLICATIONS

German Office Action dated Aug. 17, 2004 in German Application No. 103 58 203.7-22 (4 pages).

(Continued)

*Primary Examiner*—Douglas A Hess
(74) *Attorney, Agent, or Firm*—Shlesinger, Arkwright & Garvey LLP

(57) ABSTRACT

Unit for automated container recovery machines, such as for receiving returnable bottles and cans, includes a conveyor device for transporting the returnable containers horizontally in the direction of their longitudinal axes and for rotating the containers about their longitudinal axes. The aim is to provide an additional unit of this type. To achieve this, the conveyor device includes one or more continuous conveyer chains which are adjacent to one another and include support elements and conveyor members which are situated on the support elements. The conveyor members can be rotated about an axis that extends in the longitudinal direction of the conveyor device.

12 Claims, 3 Drawing Sheets

U.S. PATENT DOCUMENTS

| | | |
|---|---|---|
| 6,776,279 B2 * | 8/2004 | Krull et al. ............... 198/626.5 |
| 6,962,291 B2 * | 11/2005 | Guntveit et al. ........ 235/462.14 |
| 2003/0187546 A1 | 10/2003 | Holmen et al. |

FOREIGN PATENT DOCUMENTS

| | | |
|---|---|---|
| EP | 1 081 661 A2 | 3/2001 |
| EP | 1 167 247 B1 | 7/2003 |
| JP | 06183542 | 7/1994 |
| JP | 09286515 | 11/1997 |

OTHER PUBLICATIONS

International Search Report dated Mar. 8, 2005 in PCT application No. PCT/DE2004/002287, filed Oct. 15, 2004 (3 pages).

* cited by examiner

UNIT FOR USE IN AUTOMATIC CONTAINER RETURN SYSTEMS

CROSS-REFERENCE TO RELATED APPLICATIONS

This application is a continuation of application No. PCT/DE2004/002287, filed 15 Oct. 2004, which claims priority of German Application No. 103 58 203.7, filed 12 Dec. 2003, and each of which is incorporated herein by reference.

FIELD OF THE INVENTION

The present invention relates to a unit for use in automatic container return systems. More particularly, the invention relates to a unit for use in an automatic returnable container return system of the type including a conveyor device for horizontal transport of the returnable containers in the direction of the longitudinal axis of the returnable containers, and for rotation of the containers around their longitudinal axes.

BACKGROUND OF THE INVENTION

One unit of this type is known from EP 1 167 247 B 1. It comprises at least two essentially cylindrical conveyor rollers that are aligned parallel to one another, longitudinally in the direction of conveyance of the articles. The conveyor rollers are capable of rotating around their longitudinal axes, and each conveyor roller comprises an integrated conveyor belt that rotates around the said roller. The top run of each conveyor belt is essentially aligned on the circumferential surface of the conveyor rollers, which in the region of the top run of the conveyor belts is recessed. To enable the longitudinal transport of the containers, the conveyor rollers are tilted toward one another such that the two top runs of the conveyor belts form a V-shaped channel, in which the container lies. Containers are transported longitudinally until they reach an identification unit, which is designed to scan data on the container, for example a barcode on its outer surface. The identification unit is ordinarily positioned above the path of conveyance or to its side. Because the circumferential surfaces of the containers lie in random positions once the containers have been loaded into the unit, the barcode may not lie within the scanning range of the identification unit. In such cases it is necessary to rotate the container. This is accomplished by means of a unidirectional rotation of the conveyor rollers, which causes the conveyor belts integrated into said rollers also to rotate. Once the distinguishing markings on the container have been scanned, the conveyor rollers reassume a position in which the top runs of the conveyor belts form a V-shaped channel. By actuating the conveyor belts, the container is then advanced in a longitudinal direction for further processing or is conveyed in a reverse direction if it is identified as a container that cannot be accepted by the system.

Another unit of this type is disclosed in EP 1 081 661 A 2. This unit comprises two conveyors that are essentially identical in design; these are comprised of conveyor elements and are tilted toward one another so as to form a V-shaped channel. Between the transport elements, slots are provided extending transversely to the longitudinal direction of conveyance. Beneath the two conveyors, rotational discs are arranged, extending over at least a portion of the length of the conveyors, in which discs can be raised so that they protrude through the slots in the transport elements. When this function is activated, a container lying on the conveyors is lifted off the conveyors by the rotating discs. The container then rests on the rotating discs and can be placed in rotation via the unidirectional actuation of the rotating discs. As in the above case, this allows an obscured identifying mark on the container, such as a barcode, to be scanned by an identification unit.

OBJECTS AND SUMMARY OF THE INVENTION

An object of the present invention is to provide a conveyor unit for use in automatic container return systems. This object is attained according to the invention with a unit for use in an automatic container return system of the type including a conveyor device for horizontal transport of the returnable containers in the direction of the longitudinal axis of the returnable containers, and for rotation of the containers around their longitudinal axes, the unit including a conveyor device having a circulating conveyor chain. A support element provided on the conveyor chain, and conveyor members provided on the support elements. The conveyor members are rotatable around an axis extending longitudinally in the direction of conveyance.

With the present invention, the conveyor members in the conveyor chain produce both the translational motion and the rotational motion of the container. Thus additional components required for rotating the container can be omitted.

In one advantageous embodiment of the invention, the support element for the conveyor members is a taut cable or belt. A taut cable or belt is a very simply implemented support element, on which the conveyor members can be lined up like beads on a chain. A support element of this type offers the additional advantage of simultaneously serving as the rotational axis for the conveyor members.

In a further advantageous embodiment of the invention, the support element for the conveyor members is a link chain with recesses in links, and which recesses extend transversely to the direction of conveyance, whereby the conveyor members are disk-shaped and are rotatably mounted in the recesses on individual shafts which extend longitudinally in the direction of conveyance and which are supported in the respective links. In this case it is advantageous for each link in the link chain to have two recesses arranged side by side, extending transversely to the longitudinal direction of conveyance, and with one conveyor member being arranged in each recess. In this manner, the cost of two separate conveyor chains can be eliminated.

If the conveyor chains of the device are arranged side by side, the inventive apparatus can also be used without great expense as a conveying device for conveying boxes, packages, and the like. When the conveyor chains are moved in a longitudinal direction, the boxes, packages, and similar articles are transported in a longitudinal direction, and when the conveyor members are rotated, such articles are moved in a transverse direction. Sorting gates or sorting areas for boxes, packages, and similar articles can be constructed on the basis of this principle.

Below, the invention will be described in greater detail with reference to two exemplary embodiments.

DETAILED DESCRIPTION OF THE INVENTION

Figure 1:
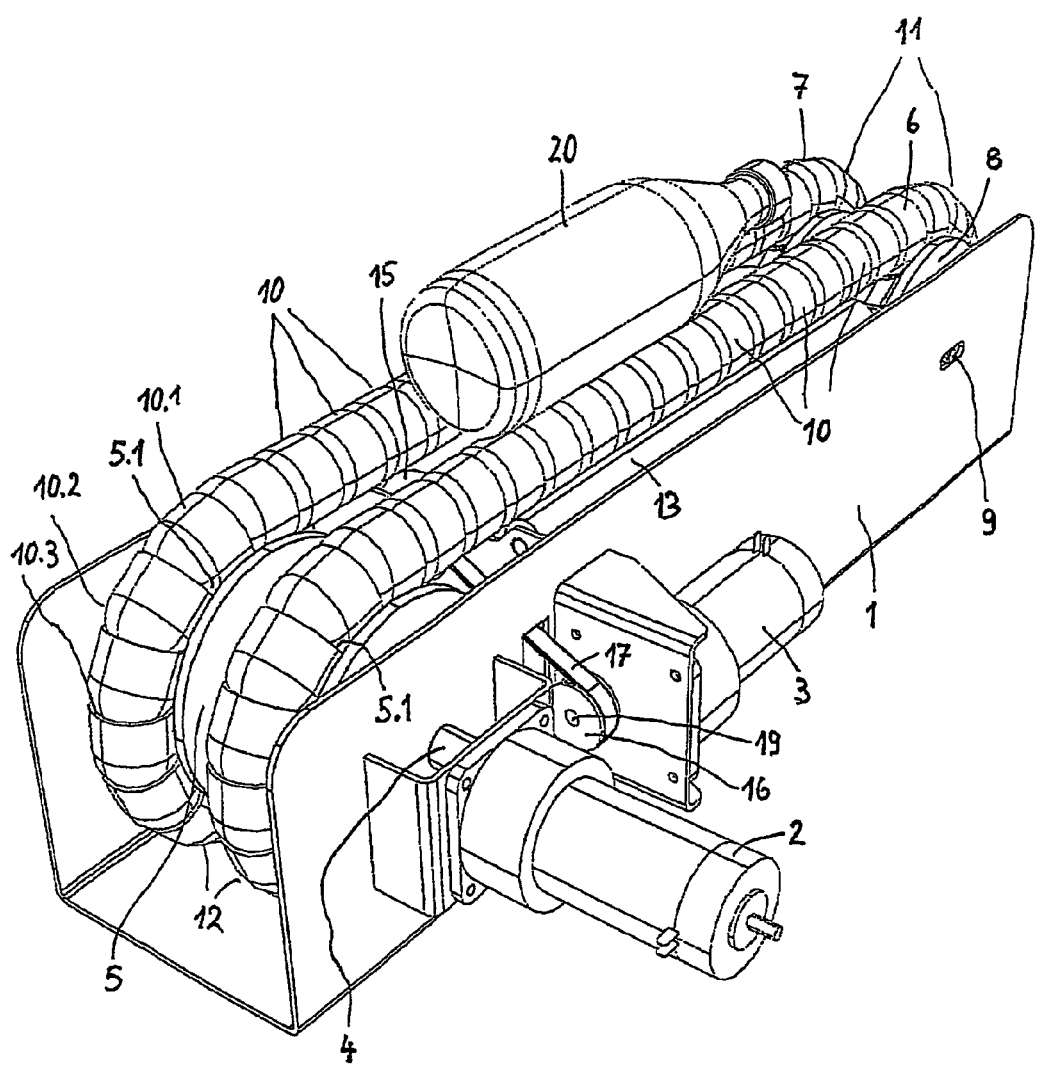
FIG. 1 is a perspective view of a unit according to a first embodiment of the present invention.

The inventive embodiment of the unit shown in FIG. 1 includes a base frame 1 that is U-shaped in cross-section, on an outer panel of which two electric motors 2, 3 are mounted. A drive shaft 4 of the electric motor 2 projects through the base frame 1 and supports a chain drive sprocket 5, which has two circumferential grooves 5.1 which are essentially semi-circular in cross-section and are configured to hold two conveyor chains 6, 7. An identical sprocket wheel 8 is rotatably mounted at the other end of the base frame 1 in its side panels. For this sprocket wheel 8, a tensioning device 9 is provided, which is not further depicted in the drawing.

Figure 2:
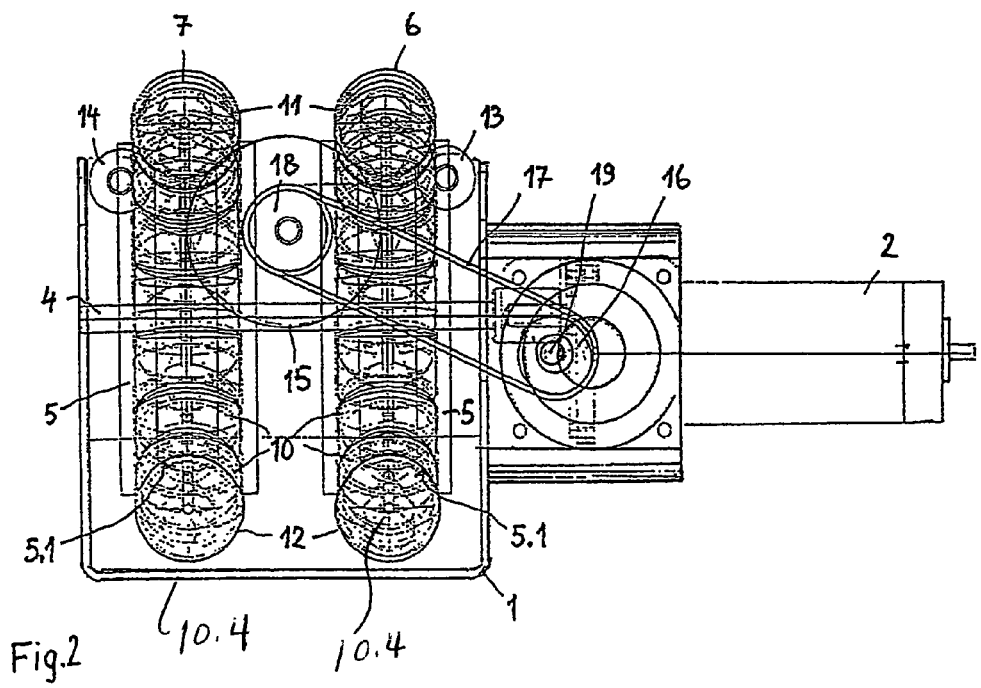
FIG. 2 is a front elevation of this unit of FIG. 1.

The conveyor chains 6, 7 include individual conveyor members 10. Each conveyor chain 6, 7 includes a steel cable 10.4 as a support element, which is shown in FIG. 2, on which the conveyor members 10 are lined up. Each conveyor member 10 has a cylindrical circumferential surface 10.1 and, on its end surfaces, in a male-female manner, a semicircular head 10.2 and a semicircular shell 10.3. On the basis of this configuration, the conveyor members 10 engage in one another in the conveyor chain 6, 7, and can also take on the curvature of the sprocket wheels 5, 8.

The conveyor chains 6, 7 rotate on the sprocket wheels 5, 8 and thus have a top run 11 and a bottom return run 12, such as an upper side and a lower side, respectively. The top runs 11 are guided at their edges by two support rollers 13, 14, which are rotatably mounted on the base frame 1.

Beneath the top run 11 of the conveyor chains 6, 7 a pressure roller 15 is arranged centrally relative to the conveyor chains 6, 7, extending longitudinally in the direction of conveyance. The pressure roller 15 includes a rotary drive, which includes a toothed belt wheel 16 that rests on a drive shaft 19 of the electric motor 3, a toothed belt 17, and a toothed belt wheel 18 that rests on the axle of the pressure roller 15. The circumferential surface of the pressure roller 15 bears against the cylindrical surfaces 10.1 of the conveyor members 10 arranged above it.

When the electric motor 2 is activated for the purpose of driving the sprocket wheel 5, a bottle 20 lying on the conveyor chains 6, 7 is conveyed longitudinally along the conveyor chains 6, 7. Once the bottle 20 reaches a position above the pressure roller 15, the electric motor 2 can be stopped in this position, for example by use of a photoelectric sensor or some other type of sensor. If at this point the pressure roller 15 is placed in rotation by the electric motor 3 and the toothed belt drive 16, 17, 18, the resulting friction will cause the abutting conveyor members 10 to rotate around the steel cables, each of which forms an axis of rotation. The bottle 20 lying on these conveyor members 10 will then begin to rotate in the same direction as the pressure roller 15. This rotational motion of the bottle 20 will bring an identifying marking on the bottle 20, such as a barcode, into the scanning range of a sensor, for example a barcode reader, so that distinguishing characteristics specific to the bottle can be read into the system. If the identification unit should determine that the bottle is returnable, it is further advanced in the previous longitudinal direction. If the bottle 20 is a container of the type which cannot be accepted by the system, it can be returned, for example, to an input area, by reversing the drive of the conveyor chains 6, 7.

To minimize the friction between the conveyor members 10 and the pressure roller 15 during the translational actuation of the conveyor chains 6, 7, either the pressure roller 15 can be pivoted downward, away from the conveyor members 10, or the pressure roller 15 can be equipped with releases arranged longitudinally along the lines of contact with the conveyor members 10. In this case it is necessary, once the rotational motion has been completed, to realign the releases underneath the conveyor members 10. For this purpose, a positioning sensor for the pressure roller 15 can be provided.

If the friction between the pressure roller 15 and the conveyor members 10 during the translational actuation of the conveyor chains 6, 7 is to be disregarded, then the rotational drive can also be activated. In this case, the bottle 20 will move in a helical fashion.

If, rather than just two conveyor chains 6, 7 as in the above exemplary embodiment, multiple conveyor chains are to be aligned side by side, the unit can also be used as sorting gates or in sorting areas for boxes, packages, or similar articles. In this case the boxes, packages, and the like are transported longitudinally along the conveyor chains with their translational actuation, and with the rotational actuation of the conveyor members 10 such articles are transported transversely relative to the longitudinal extension of the conveyor chains.

Figure 5:
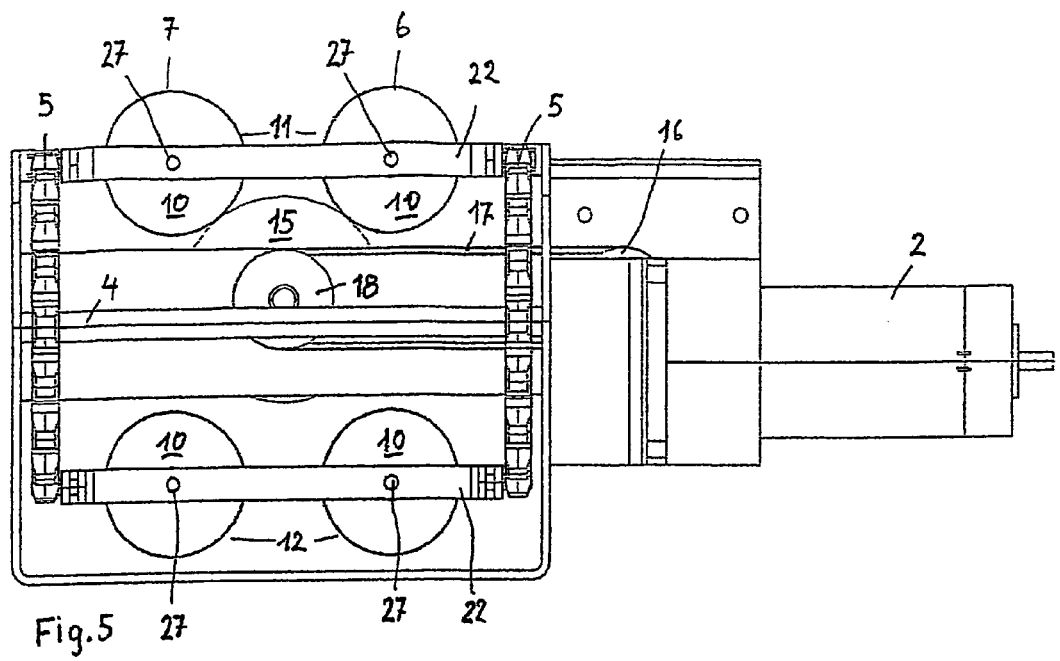
FIG. 5 is a front elevation of this unit of FIG. 3.
Figure 3:
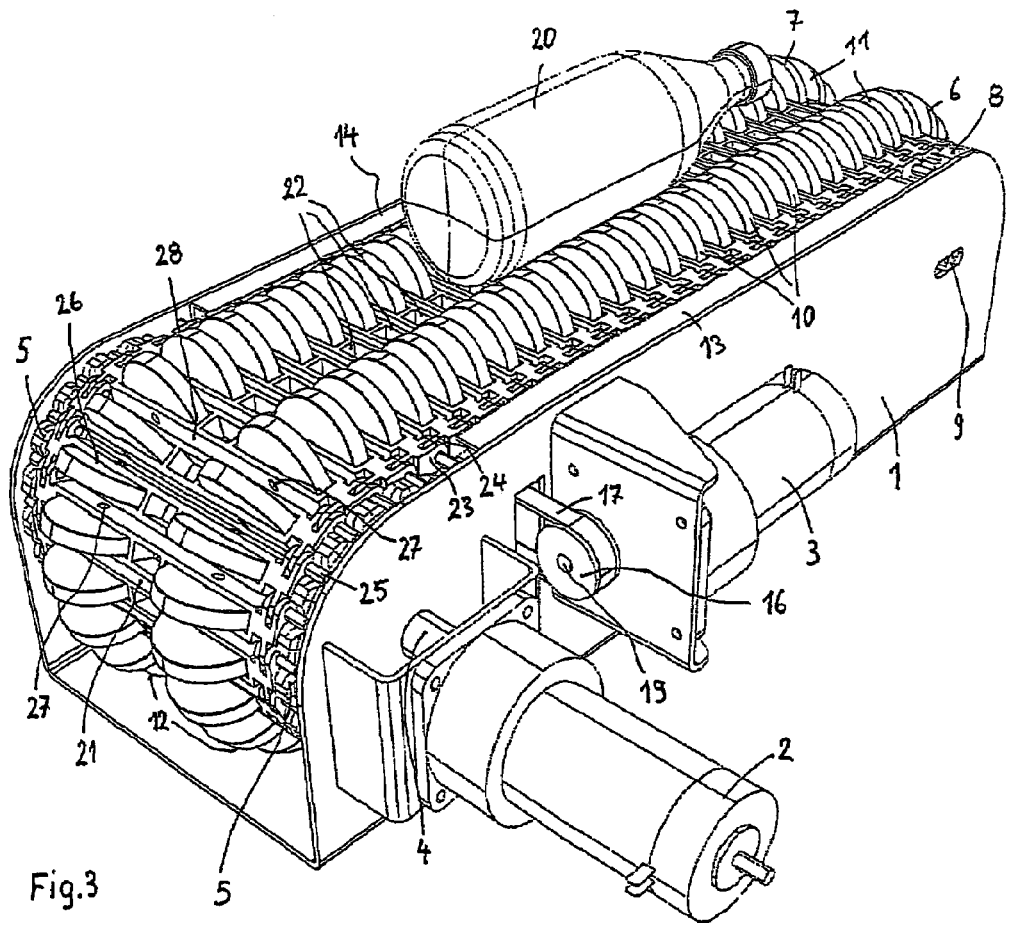
FIG. 3 is a perspective representation of a unit according to a second embodiment of the invention.
Figure 4:
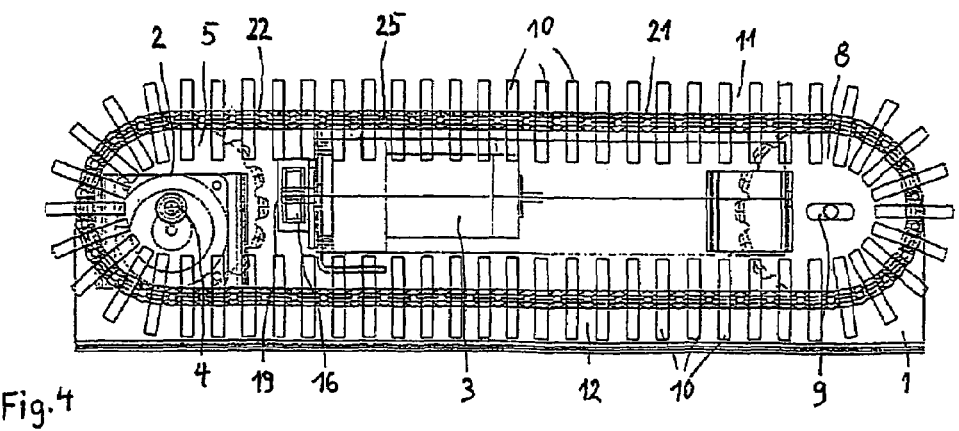
FIG. 4 is a side elevation of this unit of FIG. 3, in reduced dimensions.

In FIG. 3 through 5 a further exemplary embodiment of the invention is illustrated. The reference figures used in the above-described exemplary embodiment are used here again to identify identical or equivalent components.

This unit also includes base frame 1 with U-shaped cross-section, on the side panel of which electric motor 2 for translational motion and electric motor 3 for rotational motion of the conveyor assembly are mounted. Two sprocket wheels 5 rest on the drive shaft 4 of the electric motor 2, each lying adjacent to the side walls of the base frame 1 on the inside. Identical, but not actuated, sprocket wheels 8 are mounted at the opposite end of the unit on the side walls of the base frame 1.

A link chain 21 including links 22 that are connected to one another in an articulated fashion runs over the sprocket wheels 5, 8. Each of the articulated joints between the links 22 is designed with female joint elements 23 and male joint elements 24 at their side ends, with these two joint elements 23, 24 being connected to one another by means of a link pin 25 that projects to the side. These link pins 25 lie within the tooth spaces of the sprocket wheels 5, 8, so that a secure transmission of force via the motor shaft 4 and the actuated sprocket wheels 5 to the link chain 21 is ensured. The non-driven sprocket wheels 8 which can in turn be acted upon by a tensioning device 9 which is partially illustrated, allowing the adjustment of the tension in the link chain 21. The top run of the link chain 21 is guided over its link pins 25 in lateral guides 13, 14 that are U-shaped in cross-section.

The link chain 21 forms a support element for disc-shaped conveyor members 10 that are arranged extending transversely to the longitudinal direction of conveyance. To accommodate these conveyor members 10, each link 22 in the link chain 21 comprises two recesses 26 arranged side by side and arranged extending transversely to the longitudinal direction of conveyance. The conveyor members 10 are rotatably mounted in the recesses 22. In addition, shafts are provided, aligned in the longitudinal direction of conveyance, which extend through the conveyor members 10 and are mounted in cross supports 28 on each of the links 22.

With the side-by-side arrangement of the conveyor members 10 in link chain 21, as with the preceding exemplary embodiment, two conveyor chains 6, 7 are created, on whose conveyor members 10 a bottle 20 being transported is laterally supported.

For the rotary actuation of the conveyor members 10 a pressure roller 15 is provided. The positioning, construction, and actuation of this pressure roller 15 are as described in reference to the first exemplary embodiment.

This unit, too, enables the helical movement of a bottle 20 with the simultaneous activation of the translational and rotational drives.

For details on the mode of operation of the unit according to the second exemplary embodiment, please refer to the first exemplary embodiment, as the operating principles are identical. The unit illustrated in FIG. 3 through 5 can also be used as sorting gates or in a sorting area for boxes, packages or similar articles.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

The invention claimed is:

1. Unit for use in an automatic container return system, comprising:
 a) a conveyor device for horizontal transport of a returnable container in a direction of conveyance along a longitudinal axis of the container, the conveyor device including a circulating conveyor chain;
 b) the conveyor chain including conveyor members and a support element for holding the conveyor members;
 c) the conveyor members being rotatable around an axis of rotation extending longitudinally in the direction of conveyance; and
 d) a pressure roller engageable against the conveyor members to rotate the conveyor members around the axis.

2. Unit for use in an automatic container return system according to claim 1, wherein:
 a) the conveyor members are configured to be rotationally symmetrical around the axis of rotation.

3. Unit for use in an automatic container return system according to claim 2, wherein:
 a) the support element for the conveyor members includes a cable, which also serves as the axis of rotation for the conveyor members.

4. Unit for use in an automatic container return system according to claim 2, wherein:
 a) the support element for the conveyor members includes a link chain, each link including recesses that extend transversely to the direction of conveyance; and
 b) the conveyor members are disc-shaped rotatably mounted in the recesses on respective individual shafts that extend in the direction of conveyance.

5. Unit for use in an automatic container return system according to claim 4, wherein:
 a) each link in the link chain includes two recesses arranged side by side, transversely to the direction of conveyance, and in each of which one conveyor member is disposed.

6. Unit for use in an automatic container return system according to claim 5, wherein:
 a) the pressure roller is disposed between a top run and a bottom return run of the conveyor chain.

7. Unit for use in an automatic container return system according to claim 6, wherein:
 a) the top run of the conveyor chain includes lateral supports.

8. Unit for use in an automatic container return system according to claim 1, wherein:
 a) the support element for the conveyor members includes a cable, which also serves as the axis of rotation for the conveyor members.

9. Unit for use in an automatic container return system according to claim 1, wherein:
 a) the support element for the conveyor members includes a link chain, each link including recesses that extend transversely to the direction of conveyance; and
 b) the conveyor members are disc-shaped rotatably mounted in the recesses on respective individual shafts that extend in the direction of conveyance.

10. Unit for use in an automatic container return system according to claim 1, wherein:
 a) each conveyor member includes a cylindrical circumferential surface.

11. Unit for use in an automatic container return system according to claim 10, wherein:
 a) said conveyor members are arranged end to end;
 b) each conveyor member has a semicircular male end and an opposite semicircular female end; and
 c) the male end of one conveyor member is received in a female end of a next conveyor member.

12. A conveyor assembly for use in an automatic article return system, comprising:
 a) first and second circulating conveyor chains arranged side by side for horizontal transport of a container in a first direction of conveyance;
 b) each conveyor chain including conveyor members and a support element for holding the conveyor members;
 c) the conveyor members being rotatable around an axis of rotation extending longitudinally in the first direction of conveyance; and
 d) a pressure roller engageable against the conveyor members to rotate the conveyor members around the axis for horizontal transport of the container along a second direction of conveyance transverse to the first direction.

* * * * *